Patented Apr. 25, 1950

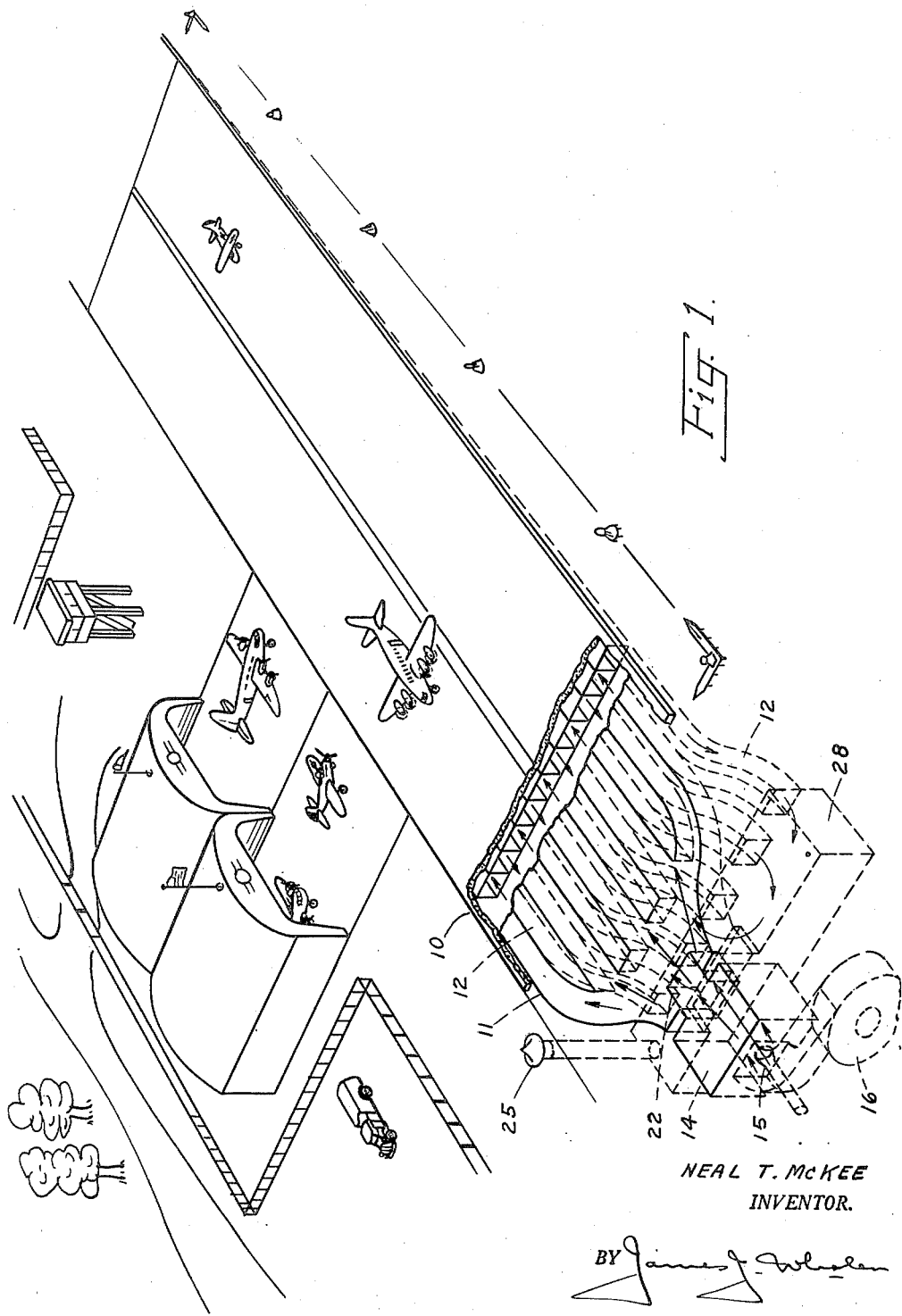

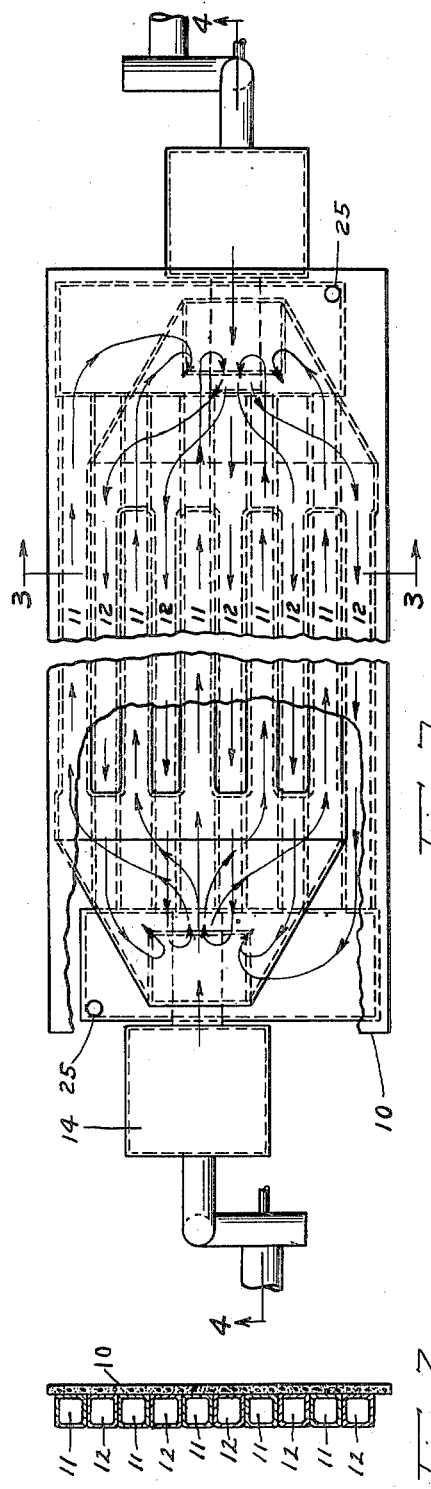

2,505,622

UNITED STATES PATENT OFFICE 2,505,622

AIRPORT RUNWAY HEATING SYSTEM

Neal T. McKee, Bronxville, N. Y., assignor to The Air Preheater Corporation, New York, N. Y.

Application January 7, 1948, Serial No. 1,041

3 Claims. (Cl. 237—1)

The present invention relates to heating systems and particularly to an improved system for heating a surface that is exposed to the weather, such as the runway of an airport or a roadway.

It has been proposed heretofore to install steam or hot water circulating pipes beneath the surface of a sidewalk or roadway in order to raise its temperature to a point which will cause snow that falls thereon to melt. The present invention contemplates the installation beneath an airport runway or like surface of several groups of parallel, contiguously positioned ducts into which hot gases are introduced from furnaces located at opposite ends of the runway. The gases that have traversed one group of ducts are introduced into the other set of ducts and reheated by mixture with fresh hot gases so that by this recirculation of the heating medium a minimum quantity of air and heating gases need be supplied to the system. The invention will best be understood upon consideration of the following detailed description of an illustrative embodiment thereof when read in conjunction with the accompanying drawings in which:

Figure 1 is a perspective view of an airport having a runway equipped with a heating system in accordance with the present invention.

Figure 2 is a plan view, partly broken away, of the heating system shown in Figure 1;

Figure 3 is a sectional view on the line 3—3 in Figure 2; and

Figure 4 is a diagrammatic elevational view corresponding to Figure 1.

In the drawings, the numeral 10 designates the usual concrete surface of an airport runway equipped with a heating system in accordance with the invention. Closely underlying the runway surface 10 are a plurality of parallel ducts 11 and 12 extending contiguously along the length of the runway. The ducts are divided into two groups of which the alternate ducts 11 are connected at one end of the runway to a supply manifold 13 into which the hot gases of combustion are discharged from a furnace 14 fired by a fuel burner 15 and supplied with fresh air by a fan 16. The fan 16 may supply furnace 14 with an amount of air in excess of that required for combustion of the fuel so that furnace 14 becomes an air heater in which the air temperature is raised by direct mixture with the gases of combustion. At the opposite end of the field the intermediate ducts 12 are connected to a distributing manifold 23 to which hot gases are introduced by a similar furnace 24. The end portions 17 of the alternate ducts 11 remote from their furnace 13 are connected to a collecting manifold 18 which in turn connects with the supply manifold 23 for the intermediate ducts 12 by means of the conduit 19. In like manner the ends 27 of the intermediate ducts 12 that are remote from the associated furnace 24 discharge into a collecting manifold 28 that connects through a conduit 29 with the supply manifold 13 for the alternate ducts. The furnaces 14 and 24 discharge into the supply manifolds 13 and 23, respectively, through pipes 22 which are so arranged with respect to the outlet openings 30 from the conduits 19 and 29 that lead from the collecting manifolds as to cause the stream of gases from the furnaces through conduits 22 to induce a flow to the supply manifolds 13, 23 from the collecting manifolds 28, 18. The collecting manifolds 18 and 28 are provided with vents 25 for discharging from the system an amount of gases equivalent to the volume of air that is required to be introduced to the system for the combustion of fuel in the furnaces 14 and 24.

In operation the furnaces 14 and 24 supply the ducts 11 and 12 with hot gases of combustion that serve to heat the concrete surface 10 of the runway to a temperature high enough to prevent the accumulation of snow and ice thereon. The amount of heat required to melt snow flakes and snow is not very great since as a rule they fall slowly and usually in air that is not at extremely low temperatures. As a result it is unnecessary to employ plows or shovels because the snow flakes melt and evaporate substantially as fast as they fall.

By directly circulating the gases of combustion through the ducts of the heating system a relatively high efficiency may be obtained since the usual loss due to a transfer through an intermediate medium, such as water or steam, is eliminated. The introduction of the gases that have passed through one set of ducts and have been partially cooled into the supply manifold for the other set of ducts reduces the amount of hot gases that need be introduced into the system. The mixture of the gases that have been circulated through the ducts with fresh hot gases from the furnace makes it possible to construct the duct work of relatively inexpensive materials because the recirculated gases tend to temper the high temperatures of gases of combustion.

What I claim is:

1. In a heating system for the runway of an airport or like surface having a plurality of parallel ducts extending contiguously immediately beneath and underlying the surface of said runway; furnace means connecting with one end of each alternately disposed duct to supply gaseous products of combustion thereto; furnace means connecting with the oppositely located end of each intermediate duct; means for introducing and burning fuel in said furnace means; connections between the other end of each alternate duct and the adjacent furnace that supplies gaseous products of combustion to the group of intermediate ducts for mixing the gases that have been partially cooled in traversing the alternate ducts with the fresh products of combustion supplied to the intermediate ducts; and similar connections between the distal ends of the group of intermediate ducts and the furnace means that supply the group of alternate ducts.

2. In a heating system for the runway of an airport or like surface having a plurality of parallel ducts extending contiguously immediately beneath and underlying substantially the entire surface area of said runway; a pair of distributing manifolds connecting with the one end of each alternate duct and the opposite ends of the intermediate ducts, respectively; furnace means for supplying gaseous products of combustion to said manifolds; a pair of collecting manifolds connecting with the other ends of the ducts in the alternate and intermediate groups, respectively; means for introducing and burning fuel in said furnace means; connections between the collecting manifold for the alternate ducts and the adjacent distributing manifold that supplies gaseous products of combustion to the group of intermediate ducts for mixing the gases that have been partially cooled in traversing the alternate ducts with the fresh products of combustion supplied to the intermediate ducts; and similar connections between the collecting manifold for the intermediate ducts and the distributing manifold that supplies the alternate ducts.

3. A heating system as defined in claim 1 wherein distributing manifolds are provided at opposite ends of said group of ducts with the manifold at one end interposed between the alternate ducts and their furnace means and the manifold at the opposite end interposed between the intermediate ducts and their furnace means; collecting manifolds connected to the other end of said ducts in both the alternate and intermediate groups; connections between each collecting manifold for one group of ducts and the adjacent distributing manifold for the other group of ducts; and conduits for introducing the gaseous products of combustion into said distributing manifolds from the related furnace means so arranged with respect to the connections between said collecting and supply manifolds that the flow of gases from the furnaces into said distributing manifolds induces a flow of gas from the collecting into the supply manifolds to mix with the fresh gases admitted thereto.

NEAL T. McKEE.

REFERENCES CITED

The following references are of record in the file of this patent:

UNITED STATES PATENTS

| Number | Name | Date |
| --- | --- | --- |
| 223,784 | Watson | Jan. 20, 1880 |
| 795,772 | Janney | July 25, 1905 |
| 1,406,852 | Haden | Feb. 14, 1922 |

FOREIGN PATENTS

| Number | Country | Date |
| --- | --- | --- |
| 620,813 | France | Jan. 24, 1927 |